United States Patent

Mönch et al.

[11] Patent Number: 6,112,230
[45] Date of Patent: Aug. 29, 2000

[54] COMMUNICATION SYSTEM FOR INFORMATION EXCHANGE BETWEEN MASTER AND SLAVE STATIONS USING FRAMES HAVING ORGANIZATION, REQUEST AND COMMUNICATION CHANNELS

[75] Inventors: Egon Mönch, Remchingen; Rainer Berger, Albstadt, both of Germany

[73] Assignee: Alcatel, Paris, France

[21] Appl. No.: 09/061,425

[22] Filed: Apr. 16, 1998

[30] Foreign Application Priority Data

Apr. 18, 1997 [EP] European Pat. Off. .............. 97400888

[51] Int. Cl.⁷ .............................. G06F 15/16; H04Q 7/00
[52] U.S. Cl. .......................... 709/208; 370/329; 370/330
[58] Field of Search ............................ 709/208; 710/100, 710/110; 370/329, 330

[56] References Cited

U.S. PATENT DOCUMENTS

| | | | |
|---|---|---|---|
| 4,495,573 | 1/1985 | Ballegeer et al. ...................... | 710/110 |
| 4,608,685 | 8/1986 | Jain et al. . | |
| 4,827,471 | 5/1989 | Geiger et al. . | |
| 5,185,866 | 2/1993 | Francisco ................................ | 710/100 |
| 5,199,031 | 3/1993 | Dahlin .................................... | 370/110.1 |
| 5,295,140 | 3/1994 | Crisler et al. . | |
| 5,343,474 | 8/1994 | Driscoll . | |
| 5,432,788 | 7/1995 | Ozveren . | |
| 5,581,548 | 12/1996 | Ugland et al. ........................... | 370/330 |
| 5,758,127 | 5/1998 | MacAulay et al. ....................... | 710/71 |

OTHER PUBLICATIONS

"Adaptive and Portable TDMA LAN with a Bus Topology" by Kuroyanagi, Tokyo Engineering University, Tokyo, Japan, IEEE Global Tele. Conf. Nov. 28–Dec. 1, 1988. pp. 1808–1812.

Primary Examiner—Krisna Lim
Attorney, Agent, or Firm—Ware, Fressola, Van Der Sluys & Adolphson LLP

[57] ABSTRACT

A communication system having one or more master stations and one or more slave stations coupled by a bus for information exchange. The exchange of information is accomplished by transmitting signals in frames, wherein at least one frame includes three channels: an organization channel for transmitting organization information from a master station to a slave station, a request channel for transmitting request information from a slave station to a master station, and at least one communication channel for exchanging communication information between any two stations.

15 Claims, 3 Drawing Sheets

COMMUNICATION SYSTEM FOR INFORMATION EXCHANGE BETWEEN MASTER AND SLAVE STATIONS USING FRAMES HAVING ORGANIZATION, REQUEST AND COMMUNICATION CHANNELS

TECHNICAL FIELD

The invention relates to a communication system comprising at least one master station and at least one slave station and a bus coupled to said stations for exchanging information between at least two stations by transmitting signals in frames via said bus, at least one frame comprising at least three channels.

BACKGROUND OF THE INVENTION

Such a communication system is of common general knowledge and comprises for example one master station and ten slave stations and five channels. All stations may communicate with each other using said five channels. If the master station wants to communicate with one or more slave stations, said master station being in control of the entire communication system knows which channel/channels is/are not occupied and therefore free to be used for said communication. If a slave station wants to communicate with one or more other stations, it usually asks the master station for permission thereby using one channel in a first frame, whereby said master station sends its permission to said slave station thereby using the same channel in a second frame.

This known communication system is disadvantageous, inter alia, because of being complex and time-consuming.

SUMMARY OF THE INVENTION

It is an object of the invention, inter alia, to provide a communication system as described in the preamble, which is less complex and less time-consuming.

Thereto, the communication system according to the invention is characterised in that, in at least one frame, at least one channel is an organisation channel for mainly transmitting organisation information from at least one master station to at least one slave station, at least one channel is a request channel for mainly transmitting request information from at least one slave station to at least one master station, and at least one channel is a communication channel for mainly exchanging communication information between at least two stations.

By providing a frame with an organisation channel and a request channel and several communication channels, the communication system has become less complex and less time-consuming, due to the fact that it is no longer necessary to use several frames for discussing the building up of a communication. Instead of that, according to a first possibility, within one frame a slave station may send a request via said request channel and the master station may give its permission via said organisation channel, or, according to a second possibility, within said one frame the master station may send an order to for example one specific slave station via said organisation channel and said specific slave station may react via said request channel. In both cases, only one frame is necessary.

The problem of existing communication systems being complex and time-consuming is solved by defining at least three kinds of different channels within one frame, two kinds of channels for administration and one kind of channel for communication. In general, there will be one organisation channel and one request channel and several communication channels per frame.

A further advantage of the communication system according to the invention is that due to, inter alia, the low complexity and low time-consuming character the bus can be either an electrical bus or an optical bus.

A first embodiment of the communication system according to the invention is characterised in that said frames and said channels are based on time division multiplexing.

By using said time division multiplexing, according to said first possibility the request channel should in time be situated before the organisation channel in said frame, and, according to said second possibility the organisation channel should in time be situated before the request channel in said frame.

A second embodiment of the communication system according to the invention is characterised in that in at least one frame at least one communication channel is situated between at least one organisation channel and at least one request channel.

When several or all communication channels are situated in a frame between the organisation channel and the request channel, according to said first possibility the master station has got more time for reacting to the request, and according to said second possibility the slave station has got more time for reacting to the order.

A third embodiment of the communication system according to the invention is characterised in that said organisation information comprises general organisation information and specific organisation information, said specific organisation information in subsequent frames being destined for subsequent slave stations.

By having said specific organisation information in subsequent frames being destined for subsequent slave stations, in a first frame the master station may discuss the building up of a communication with a first slave station, and in a second frame the master station may discuss the building up of a communication with a second slave station, etc., in other words the organisation channel has got a cyclic character.

Another advantage of the communication system according to the invention is that, due to, inter alia, the low complexity and low time-consuming character, the frames can be either adjacent or not adjacent, and the channels in each frame can be either adjacent or not adjacent, whereby particular information could be provided with synchronisation information, for example.

The invention further relates to a master station connectable to at least one slave station via a bus for exchanging information between at least two stations by transmitting signals in frames via said bus, at least one frame comprising at least three channels.

The master station according to the invention is characterised in that the master station comprises a transmitter connectable to said bus for transmitting organisation information to at least one slave station via at least one channel being an organisation channel, a receiver connectable to said bus for receiving request information from at least one slave station via at least one channel being a request channel, and a monitoring device connectable to said bus for monitoring communication information to be exchanged between at least two stations via at least one channel being a communication channel.

A first embodiment of the master station according to the invention is characterised in that the master station comprises a processor for controlling said transmitter and said receiver and said monitoring device with said frames and said channels being based on time division multiplexing.

A second embodiment of the master station according to the invention is characterised in that in at least one frame at least one communication channel is situated between at least one organisation channel and at least one request channel.

A third embodiment of the master station according to the invention is characterised in that said organisation information comprises general organisation information and specific organisation information, said specific organisation information in subsequent frames being destined for subsequent slave stations.

The invention yet further relates to a slave station connectable to at least one master station and at least one further slave station via a bus for exchanging information between at least two stations by transmitting signals in frames via said bus, at least one frame comprising at least three channels.

The slave station according to the invention is characterised in that the slave station comprises
- a receiver connectable to said bus for receiving organisation information from at least one master station via at least one channel being an organisation channel,
- a transmitter connectable to said bus for transmitting request information to at least one master station via at least one channel being a request channel, and
- a receiver/transmitter connectable to said bus for receiving/transmitting communication information from/to at least one station via at least one channel being a communication channel.

A first embodiment of the slave station according to the invention is characterised in that the slave station comprises a processor for controlling said transmitter and said receiver and said receiver/transmitter with said frames and said channels being based on time division multiplexing.

From U.S. Pat. No. 5,432,788 a method of scheduling a conversation between a designated transmitter adapter card and a designated receiver adapter card is known. From U.S. Pat. No. 5,343,474 a media access protocol is known. From U.S. Pat. No. 4,827,471 a method for the bidirectionel data exchange between integrated building blocks through a multiprocessor bus is known. From U.S. Pat. No. 4,608,685 a packet and circuit switched communications network is known. It is not known from these documents to have, per frame, at least one channel being an organisation channel for mainly transmitting organisation information from at least one master station to at least one slave station, at least one channel being a request channel for mainly transmitting request information from at least one slave station to at least one master station, and at least one channel being a communication channel for mainly exchanging communication information between at least two stations.

BRIEF DESCRIPTION OF THE DRAWINGS

The invention will be explained in greater detail at the hand of embodiments disclosed in the drawings, whereby FIG. 1 discloses a master station and a slave station of a communication system according to the invention, FIG. 2 discloses an embodiment of an organisation channel and a communication channel and a request channel belonging to a frame, and FIG. 3 discloses a global overview of a communication system being based on an optical bus.

BEST MODE FOR CARRYING OUT THE INVENTION

Figure 1:
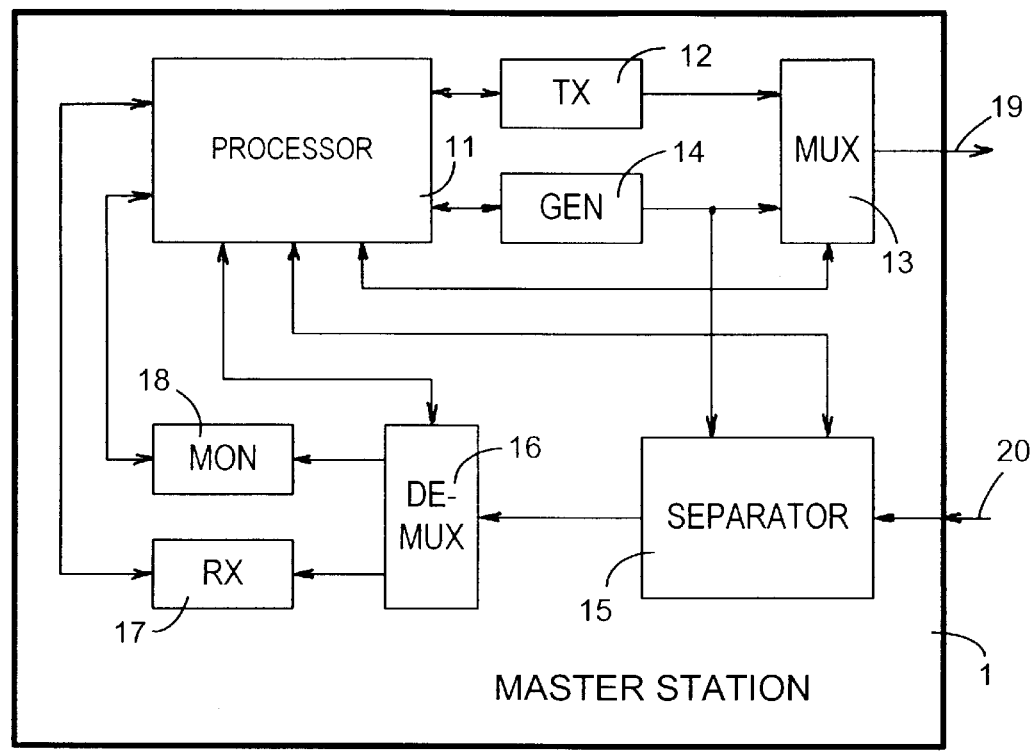
Figure 1:
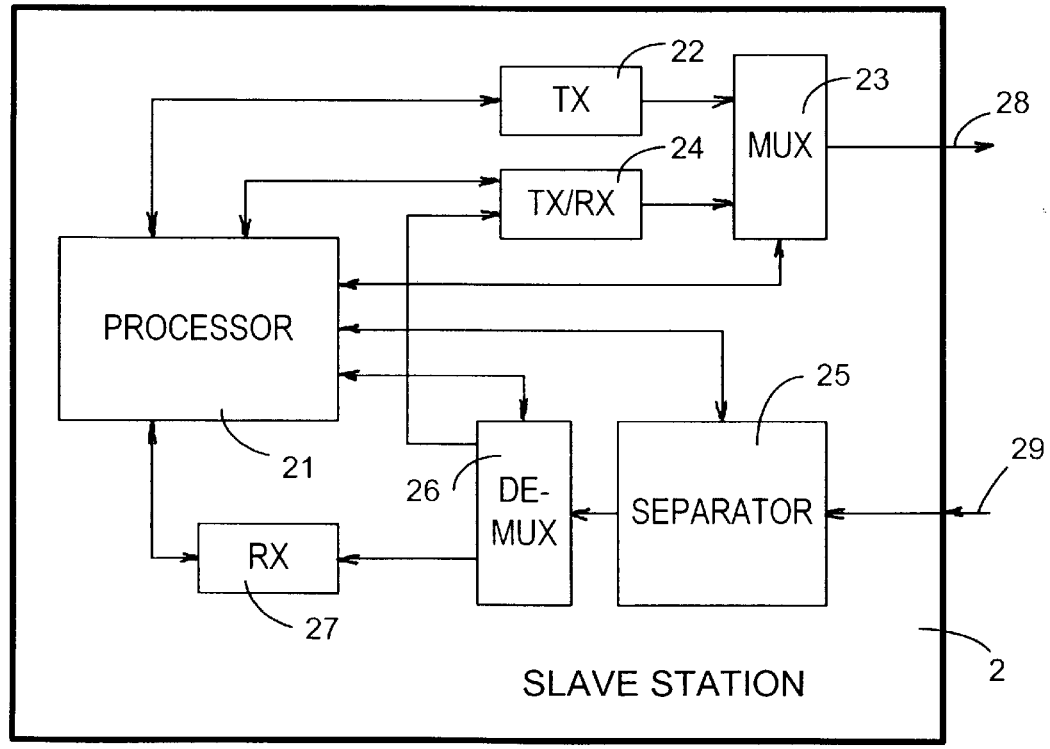

The master station 1 disclosed in FIG. 1 comprises a processor 11 for controlling a transmitter 12, a multiplexer 13, a generator 14, a separator 15, a demultiplexer 16, a receiver 17 and a monitoring device 18. Master station 1 comprises an output 19 coupled to an output of multiplexer 13, of which a first input is coupled to an output of transmitter 12 and of which a second input is coupled to an output of generator 14. Master station 1 further comprises an input 20 coupled to a first input of separator 15, of which a second input is coupled to the output of generator 14 and of which an output is coupled to an input of demultiplexer 16. A first output of demultiplexer 16 is coupled to an input of receiver 17, and a second output of demultiplexer 16 is coupled to an input of monitoring device 18. Processor 11 is coupled to a control in/output of each one of said transmitter 12, multiplexer 13, generator 14, separator 15, demultiplexer 16, receiver 17 and monitoring device 18.

The slave station 2 disclosed in FIG. 1 comprises a processor 21 for controlling a transmitter 22, a multiplexer 23, a receiver/transmitter 24, a separator 25, a demultiplexer 26 and a receiver 27. Slave station 2 comprises an output 28 coupled to an output of multiplexer 23, of which a first input is coupled to an output of transmitter 22 and of which a second input is coupled to an output of receiver/transmitter 24. Slave station 2 further comprises an input 29 coupled to an input of separator 25, of which an output is coupled to an input of demultiplexer 26. A first output of demultiplexer 26 is coupled to an input of receiver 27, and a second output of demultiplexer 26 is coupled to an input of receiver/transmitter 24. Processor 21 is coupled to a control in/output of each one of said transmitter 22, multiplexer 23, receiver/transmitter 24, separator 25, demultiplexer 26 and receiver 27.

Figure 2:
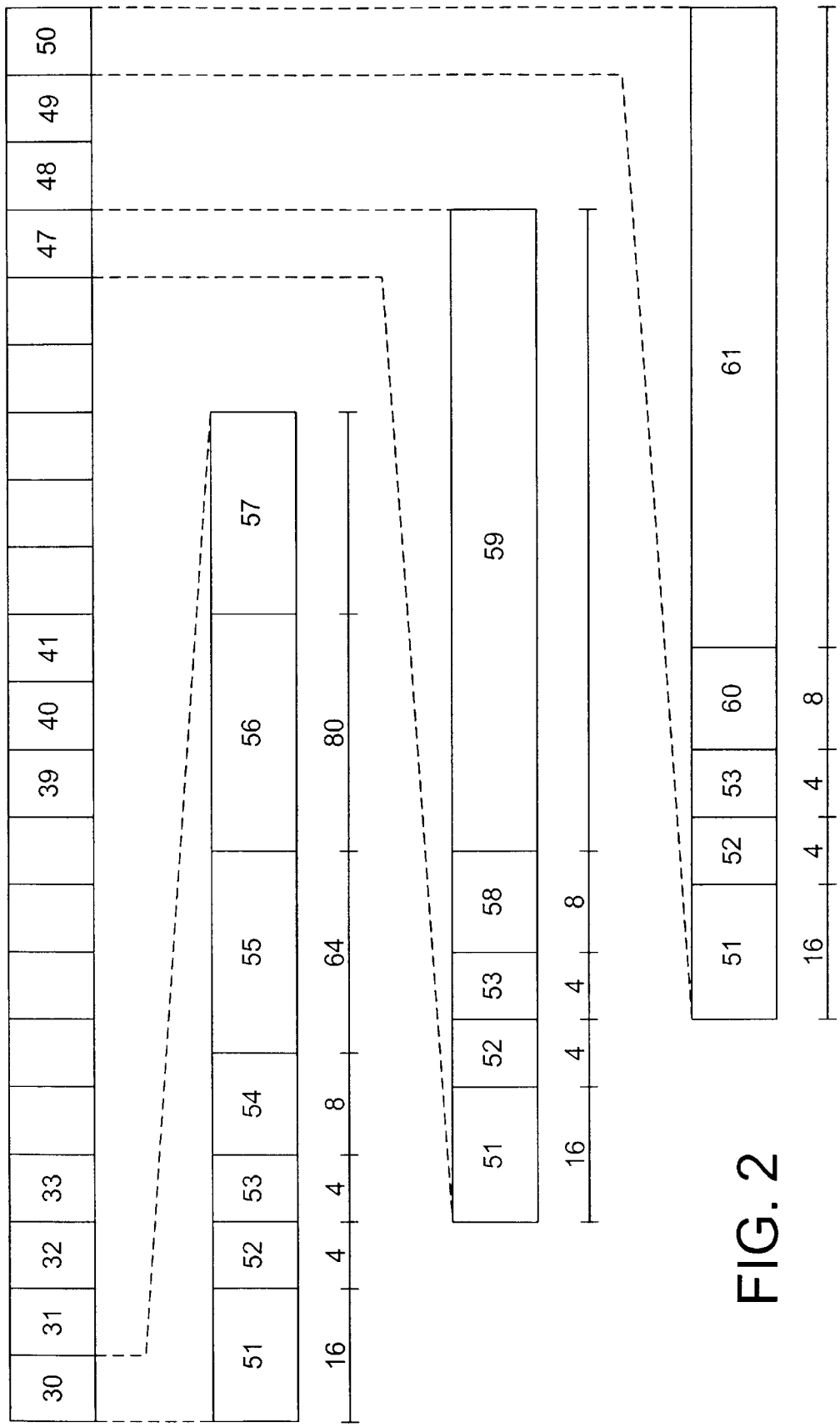

The frame disclosed in FIG. 2 comprises channels 30–50, with channel 30 being an organisation channel and with channel 50 being a request channel and with channels 31–49 being communication channels. Organisation channel 30 comprises seven fields, a first field 51 for synchronisation information, a second field 52 for a receiver address, a third field 53 for a transmitter address, a fourth field 54 for data type information, a fifth field 55 for a participant list, a sixth field 56 for a channel occupation list and a seventh field 57 for further information. Communication channel 47 comprises five fields, a first field 51 for synchronisation information, a second field 52 for a receiver address, a third field 53 for a transmitter address, a fourth field 58 for data type information and a fifth field 59 for communication data. Request channel 50 comprises five fields, a first field 51 for synchronisation information, a second field 52 for a receiver address, a third field 53 for a transmitter address, a fourth field 60 for data type information and a fifth field 61 for further information.

Figure 3:
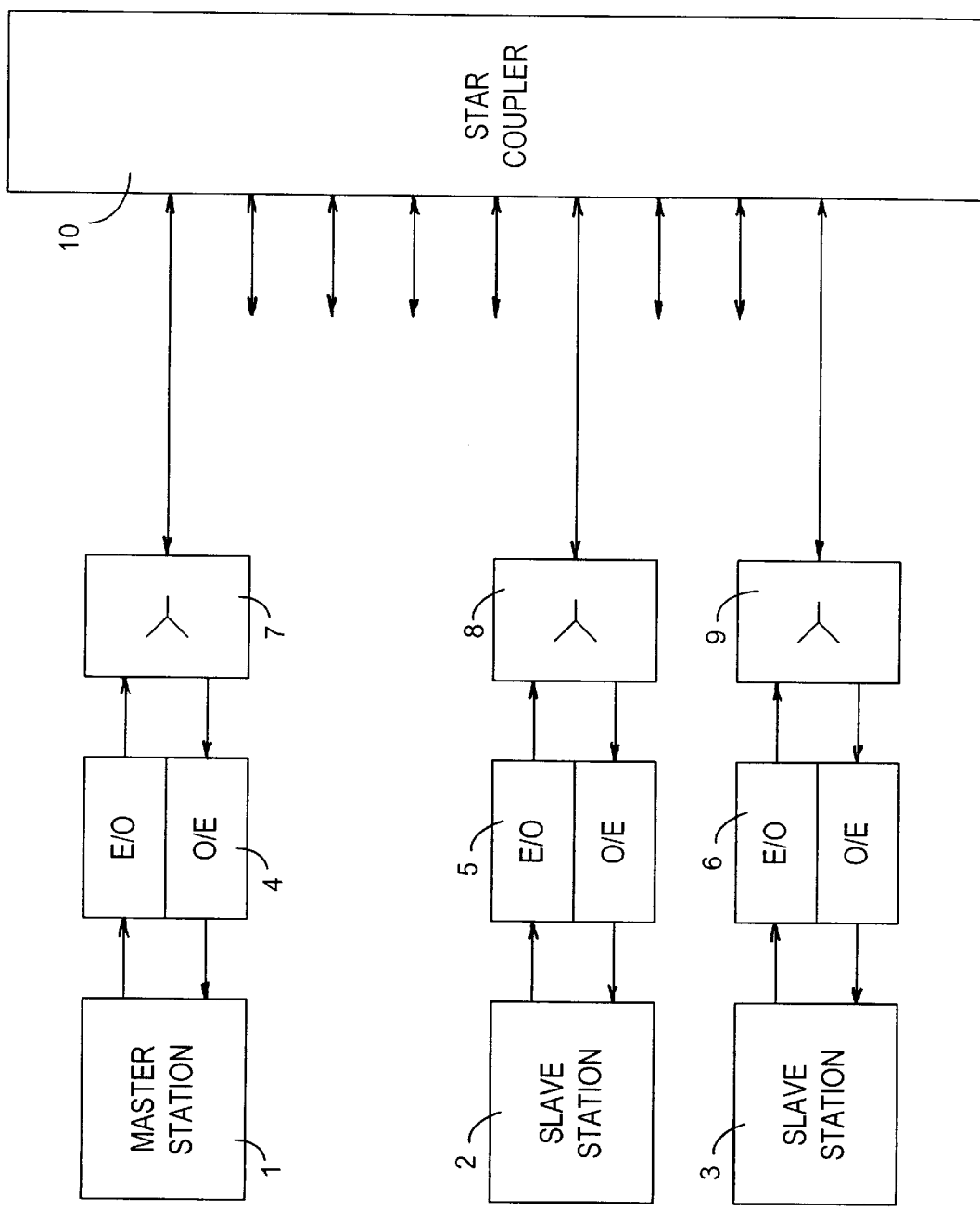

The global overview in FIG. 3 of a communication system based on an optical bus discloses said master station 1 and said slave station 2 and a further slave station 3. The outputs of the respective stations 1, 2, 3 are coupled to first inputs of respective converters 4, 5, 6 for converting electrical signals into optical signals to be generated via first outputs of the respective converters 4, 5, 6 which are coupled to inputs of respective Y-couplers 7, 8, 9, of which outputs are coupled to second inputs of respective converters 4, 5, 6 for converting optical signals into electrical signals to be generated via second outputs of the respective converters 4, 5, 6 which are coupled to the inputs of the respective stations 1, 2, 3. In/outputs of said respective Y-couplers 7, 8, 9 are coupled to respective in/outputs of a reflective or transmittive starcoupler 10.

In case slave stations 2 and 3 have been switched off, only master station 1 has been switched on, and the communication system according to the invention as disclosed in FIGS. 1, 2 and 3 functions as follows.

For a first frame, with respect to channel 30, processor 11 instructs generator 14 to generate synchronisation information (for example 16 bits) and controls multiplexer 13 in such a way that at the beginning of channel 30 this synchronisation information is supplied in field 51 via the output 19 to converter 4, which converts this synchronisation information into an optical signal which via coupler 7 is supplied to starcoupler 10. Then processor 11 instructs transmitter 12 to transmit a first receiver address (for example 4 bits like 0001 being the first slave station's address) and controls multiplexer 13 in such a way that this receiver address is supplied in field 52 via the output 19 to converter 4, which converts this receiver address into an optical signal which via coupler 7 is supplied to starcoupler 10. Then processor 11 instructs transmitter 12 to transmit a transmitter address (for example 4 bits like 0000 being the master station's address) and controls multiplexer 13 in such a way that this transmitter address is supplied in field 53 via the output 19 to converter 4, which converts this transmitter address into an optical signal which via coupler 7 is supplied to starcoupler 10. Then processor 11 instructs transmitter 12 to transmit data type information (for example 8 bits) and a participant list (for example 64 bits) and a channel occupation list (for example 80 bits) and further information, which all in this case for example could be dummy data due to the fact that the slave station's are switched off, and controls multiplexer 13 in such a way that this information is supplied in the respective fields 54, 55, 56, 57 via the output 19 to converter 4, which converts this information into an optical signal which via coupler 7 is supplied to starcoupler 10.

For said first frame, with respect to channels 31–50, for each channel processor 11 instructs generator 14 to generate synchronisation information (for example 16 bits) and controls multiplexer 13 in such a way that at the beginning of each channel 31–50 this synchronisation information is supplied in field 51 via the output 19 to converter 4, which converts this synchronisation information into an optical signal which via coupler 7 is supplied to starcoupler 10. Due to the fact that the slave station's are switched off, in said first frame with respect to channels 31–50, further nothing happens.

For a second frame following the first frame, due to the fact that the slave station's are switched off, processor 11 will give the same instructions, apart from an instruction with respect to channel 30 and destined for transmitter 12: processor 11 instructs transmitter 12 to transmit a second receiver address (for example 4 bits like 0002 being the second slave station's address) and controls multiplexer 13 in such a way that this receiver address is supplied in field 52 of channel 30 via the output 19 to converter 4, which converts this receiver address into an optical signal which via coupler 7 is supplied to starcoupler 10, etc.

For a third/fourth/fifth frame etc. following the second frame, due to the fact that the slave station's are switched off, processor 11 will give the same instructions, apart from an instruction with respect to channel 30 and destined for transmitter 12: processor 11 instructs transmitter 12 to transmit a third/fourth/fifth receiver address etc. (for example 4 bits like 0003/0004/0005 etc. being the third/fourth/fifth slave station's address etc.) and controls multiplexer 13 in such a way that this receiver address is supplied in field 52 of channel 30 via the output 19 to converter 4, which converts this receiver address into an optical signal which via coupler 7 is supplied to starcoupler 10, etc. After for example sixteen frames, the first frame (comprising in field 52 of channel 30 the first receiver address) comes up again.

In case slave stations 2 and 3 are switched on, with master station 1 already being switched on, the communication system according to the invention as disclosed in FIGS. 1, 2 and 3 functions as described above, with the following additions.

Assuming that slave station 2 has got an address 0001, in the first frame with respect to channel 30 said optical signals originating from converter 4 flow via coupler 7 and starcoupler 10 and coupler 8 to converter 5, which converts said optical signals into electrical signals, which are supplied to slave station 2. In response to this, via input 29 the synchronisation information, the receiver address (being 0001) and the transmitter address (being 0000) are supplied to separator 25, which separates the synchronisation information (while informing processor 21) and supplies the receiver address and the transmitter address to demultiplexer 26. In response to the separated synchronisation information and/or other knowledge processor 21 controls demultiplexer 26 in such a way that the receiver address and the transmitter address are supplied to receiver 27, which analyses the addresses and informs processor 21 and/or which sends the addresses to processor 21 for analysation. Then processor 21 knows that these signals are destined for slave station 2 (at the hand of the receiver address being 0001) and that these signals originate from master station 1 (at the hand of the transmitter address being 0000) and that these signals have been exchanged in channel 30 of the first frame and that the possibility exists of reporting itself to master station 1 in channel 50 of this first frame.

For said first frame, with respect to channels 31–50 said optical signals originating from converter 4 flow via coupler 7 and starcoupler 10 and coupler 8 to converter 5, which converts said optical signals into electrical signals, which are supplied to slave station 2. In response to this, via input 29 the synchronisation information of each channel 31–50 is supplied to separator 25, which separates the synchronisation information (while informing processor 21). In response to this and/or other knowledge, processor 21 knows when channel 50 is present, and instructs transmitter 22 to transmit a receiver address (0000 being the master station's address) and controls multiplexer 23 in such a way that this receiver address is supplied in field 52 via the output 28 to converter 5, which converts this receiver address into an optical signal which via coupler 8 is supplied to starcoupler 10. Then processor 21 instructs transmitter 22 to transmit a transmitter address (0001 being the first slave station's address) and controls multiplexer 23 in such a way that this transmitter address is supplied in field 53 via the output 28 to converter 5, which converts this transmitter address into an optical signal which via coupler 8 is supplied to starcoupler 10. Then processor 21 instructs transmitter 22 to transmit data type information and further information (for example indicating that this information is for reporting the first slave station to the master station), and controls multiplexer 23 in such a way that this information is supplied in the respective fields 60,61 via the output 28 to converter 5, which converts this information into an optical signal which via coupler 8 is supplied to starcoupler 10.

For said first frame with respect to channel 50 said optical signals originating from converter 5 flow via coupler 8 and starcoupler 10 and coupler 7 to converter 4, which converts said optical signals into electrical signals, which are supplied to master station 1. In response to this, via input 20 the receiver address (being 0000) and the transmitter address (being 0001) and the data type information and the further information are supplied to separator 15, which separates possible synchronisation information (while informing processor 11) and supplies the receiver address and the transmitter address and the data type information and the further information to demultiplexer 16. In response to the separated synchronisation information and/or other knowledge processor 11 controls demultiplexer 16 in such a way that the receiver address and the transmitter address and the data type information and the further information are supplied to receiver 17, which analyses the addresses and information and informs processor 11 and/or which sends the addresses and the information to processor 11 for analysation. Then processor 11 knows that these signals are destined for master station 1 (at the hand of the receiver address being 0000) and that these signals originate from slave station 2 (at the hand of the transmitter address being 0001) and that these signals have been exchanged in channel 50 of the first frame for reporting slave station 2 to master station 1.

Assuming that slave station 3 has got an address 0005, in the fifth frame with respect to channel 30 said optical signals originating from converter 4 flow via coupler 7 and starcoupler 10 and coupler 9 to converter 6, which converts said optical signals into electrical signals, which are supplied to slave station 3 (which has not been disclosed in detail in FIG. 1 but which corresponds to slave station 2). In response to this, via input 29' the synchronisation information, the receiver address (being 0005) and the transmitter address (being 0000) are supplied to separator 25', which separates the synchronisation information (while informing processor 21') and supplies the receiver address and the transmitter address to demultiplexer 26'. In response to the separated synchronisation information and/or other knowledge processor 21' controls demultiplexer 26' in such a way that the receiver address and the transmitter address are supplied to receiver 27', which analyses the addresses and informs processor 21' and/or which sends the addresses to processor 21' for analysation. Then processor 21' knows that these signals are destined for slave station 3 (at the hand of the receiver address being 0005) and that these signals originate from master station 1 (at the hand of the transmitter address being 0000) and that these signals have been exchanged in channel 30 of the fifth frame and that the possibility exists of reporting itself to master station 1 in channel 50 of this fifth frame.

For said fifth frame, with respect to channels 31–50 said optical signals originating from converter 4 flow via coupler 7 and starcoupler 10 and coupler 9 to converter 6, which converts said optical signals into electrical signals, which are supplied to slave station 3. In response to this, via input 29' the synchronisation information of each channel 31–50 is supplied to separator 25', which separates the synchronisation information (while informing processor 21'). In response to this and/or other knowledge, processor 21' knows when channel 50 is present, and instructs transmitter 22' to transmit a receiver address (0000 being the master station's address) and controls multiplexer 23' in such a way that this receiver address is supplied in field 52 via the output 28' to converter 6, which converts this receiver address into an optical signal which via coupler 9 is supplied to starcoupler 10. Then processor 21' instructs transmitter 22' to transmit a transmitter address (0005 being the second slave station's address) and controls multiplexer 23' in such a way that this transmitter address is supplied in field 53 via the output 28' to converter 6, which converts this transmitter address into an optical signal which via coupler 9 is supplied to starcoupler 10. Then processor 21' instructs transmitter 22' to transmit data type information and further information (for example indicating that this information is for reporting the second slave station to the master station), and controls multiplexer 23' in such a way that this information is supplied in the respective fields 60,61 via the output 28' to converter 6, which converts this information into an optical signal which via coupler 9 is supplied to starcoupler 10.

For said fifth frame with respect to channel 50 said optical signals originating from converter 6 flow via coupler 9 and starcoupler 10 and coupler 7 to converter 4, which converts said optical signals into electrical signals, which are supplied to master station 1. In response to this, via input 20 the receiver address (being 0000) and the transmitter address (being 0005) and the data type information and the further information are supplied to separator 15, which separates possible synchronisation information (while informing processor 11) and supplies the receiver address and the transmitter address and the data type information and the further information to demultiplexer 16. In response to the separated synchronisation information and/or other knowledge processor 11 controls demultiplexer 16 in such a way that the receiver address and the transmitter address and the data type information and the further information are supplied to receiver 17, which analyses the addresses and information and informs processor 11 and/or which sends the addresses and the information to processor 11 for analysation. Then processor 11 knows that these signals are destined for master station 1 (at the hand of the receiver address being 0000) and that these signals originate from slave station 3 (at the hand of the transmitter address being 0005) and that these signals have been exchanged in channel 50 of the fifth frame for reporting slave station 3 to master station 1.

Master station 1 is now informed of slave stations 2 and 3 being switched on, as a consequence of which in each frame in channel 30 in field 55 processor 11 will put a participant list for informing all slave stations which other slave stations have reported themselves. Being informed of this, a first slave station may request to communicate with a second slave station by sending the request to the master station in channel 50 of the frame corresponding to this first slave station. Then the master station could either inform both slave stations separately in channel 30 of their own frame and/or put a channel occupation list in each frame in channel 30 in field 56, thereby indicating which one (or more) of the channels 31–49 may be used. Both slave stations can then communicate, thereby now using receiver/transmitter 24 instead of receiver 27 and transmitter 22. After communication, either at least one of both slave stations could inform the master station, and/or the master station could detect the end of the communication, thereby using monitoring device 18.

Said multiplexers, demultiplexers, separators, receivers, transmitters, generator, receiver/transmitter and monitoring device can, in view of the above, all be realised by a person skilled in the art by using standard (digital) hardware technology like comparators, adders, subtracters, phase locked loops, ex-ors, ands, ors, nands, nors, etc., and/or by using software technology, as a consequence of which for example at least one but preferably more than one of said multiplexers, demultiplexers, separators, receivers, transmitters, generator, receiver/transmitter and monitoring device could be integrated together with the processors. Further, for example instead of said separators it could be possible to use detectors and to shift a possible separation function into the processors. Said converters, couplers and starcoupler can be bought in a shop. In view of this, it will be obvious that FIGS. 1, 2 and 3 only disclose an embodiment, and that many alternatives will be possible.

Due to using the reflective starcoupler all stations will receive all signals but will ignore those signals which are destined for an other station. According to a first embodiment each station uses each synchronisation information, according to a second embodiment at least one station comprises a mechanism that allows said station to ignore at least a part of the synchronisation information. Said synchronisation information could be the same in each channel and in each frame, the stations then being of low complexity, or could be different per frame, or could be different per channel, the stations then getting an increased complexity.

According to an other emodiment each station that uses a channel for transmitting information also generates and transmits said synchronisation information, instead of said master station all the time transmitting said synchronisation information. In that case it is no longer necessary that said master station is switched on before a slave station is switched on, and could said master station temporarily being switched off during a communication taking place between two slave stations. Further, according to this embodiment and all previous described embodiments, it is a great advantage that the invention offers 100% dynamic configuration possibilities and 100% dynamic monitoring possibilities.

Instead of using a particular address in field 52 it could be possible to use a so-called broadcast address, thereby creating a broadcast transmission (from one to many/all). The data type information in field 54 could for example use value 0–127 for an exchange of control-info between master and slave (like an indication of a list or of the closing of a channel or of a report), and could then use 128–256 for an exchange of communication-info between two slaves (like an indication of storing or replacing data).

At 200 frames per second one frame may take 0.5 msec=500 usec; at 21 channels per frame one channle may take 23.8 usec. At ca. 4000 bits per channel, this corresponds with ca. 168 Mbit/sec. This capacity will become 152 Mbit/sec. when taking into account that two of said 21 channels are not used for straight communication, and will become even lower when taking into account that a possible gap may be present between two channels and/or between for example the synchronisation information and the following information.

So, in general, the organisation channel is used for informing all slave stations and for (per frame) controlling one of them. The request channel is in general used by one slave station (per frame) for requesting communication capacity, but could further be used for for example the generation by the slave station of a periodic report (in other words reporting periodically instead of once after being switched on). During said request, a slave station could further indicate a certain capacity and/or a possible priority, which could be confirmed and/or adapted and/or indicated in for example field 54 and/or field 55 and/or field 56 by the master station.

What is claimed is:

1. A communication system comprising at least one master station and at least one slave station and a bus coupled to said stations for exchanging information between at least two stations by transmitting signals in frames via said bus, at least one frame comprising at least three channels, characterised in that, in at least one frame, at least one channel is an organisation channel for mainly transmitting organisation information from at least one master station to at least one slave station, at least one channel is a request channel for mainly transmitting request information from at least one slave station to at least one master station, and at least one channel is a communication channel for mainly exchanging communication information between at least two stations.

2. A communication system according to claim 1, characterised in that same frames and said channels are based on time division multiplexing.

3. A communication system according to claim 2, characterised in that in at least one frame at least one communication channel is situation between at least one organisation channel and at least one request channel.

4. A communication system according to claim 3, characterised in that said organisation information comprises general organisation information and specific organisation information, said specific organisation information in subsequent frames being destined for subsequent slave stations.

5. A communication system according to claim 2, characterised in that said organisation information comprises general organisation information and specific organisation information, said specific organisation information in subsequent frames being destined for subsequent slave stations.

6. A communication system according to claim 1, characterised in that in at least one frame at least one communication channel is situation between at least one organisation channel and at least one request channel.

7. A communication system according to claim 1, characterised in that said organisation information comprises general organisation information and specific organisation information, said specific organisation information in subsequent frames being destined for subsequent slave stations.

8. A slave station connectable to at least one master station and at least one further slave station via a bus for exchanging information between at least two stations by transmitting signals in frames via said bus, at least one frame comprising at least three channels, characterised in that the slave station comprises a receiver connectable to said bus for receiving organisation information from at least one master station via at least one channel being an organisation channel, a transmitter connectable to said bus for transmitting request information to at least one master station via at least one channel being a request channel, and a receiver/transmitter connectable to said bus for receiving/transmitting communication information from/to at least one station via at least one channel being a communication channel.

9. A slave station according to claim 8, characterised in that the slave station comprises a processor for controlling said transmitter and said receiver and said receiver/transmitter with said frames and said channels being based on time division multiplexing.

10. A master station connectable to at least one slave station via a bus for exchanging information between at least two stations by transmitting signals in frames via said bus, at least one frame comprising at least three channels, characterised in that the master station comprises a transmitter connectable to said bus for transmitting organisation information to at least one slave station via at least one channel being an organisation channel, a receiver connectable to said bus for receiving request information from at least one slave station via at least one channel being a request channel, and a monitoring device connectable to said bus for monitoring communication information to be exchanged between at least two stations via at least one channel being a communication channel.

11. A master station according to claim 10, characterised in that the master station comprises a processor for controlling said transmitter and said receiver and said monitoring device with said frames and said channels being based on time division multiplexing.

12. A master station according to claim 11, characterised in that in at least one frame at least one communication channel is situated between at least one organisation channel and at least one request channel.

13. A master station according to claim 12, characterised in that said organisation information comprises general organisation information and specific organisation information, said specific organisation information in subsequent frames being destined for subsequent slave stations.

14. A master station according to claim 10, characterised in that said organisation information comprises general organisation information and specific organisation information, said specific organisation information in subsequent frames being destined for subsequent slave stations.

15. A master station according to claim 11, characterised in that said organisation information comprises general organisation information and specific organisation information, said specific organisation information in subsequent frames being destined for subsequent slave stations.

* * * * *